Sept. 24, 1968     T. B. DALTON     3,402,915

POWER PACKAGE FOR SEMI-TRAILER SUPPORT

Filed Aug. 1, 1966     2 Sheets-Sheet 1

INVENTOR
THOMAS B. DALTON

BY *Hauke, Kraus, & Gifford*

ATTORNEY

Sept. 24, 1968   T. B. DALTON   3,402,915
POWER PACKAGE FOR SEMI-TRAILER SUPPORT
Filed Aug. 1, 1966   2 Sheets-Sheet 2

INVENTOR
THOMAS B. DALTON
BY
ATTORNEYS

United States Patent Office 3,402,915
Patented Sept. 24, 1968

3,402,915
POWER PACKAGE FOR SEMI-TRAILER SUPPORT
Thomas B. Dalton, Muskegon, Mich., assignor to Westran Corporation, Muskegon, Mich.
Filed Aug. 1, 1966, Ser. No. 569,253
6 Claims. (Cl. 254—86)

ABSTRACT OF THE DISCLOSURE

A semi-trailer landing gear operated by a reversible DC motor through a switch control normally biased to a position raising the landing gear. A rechargeable storage battery is mounted on the semi-trailer and is rechargeable from the tractor electrical system through a current directional and limiting element.

Figure 1:
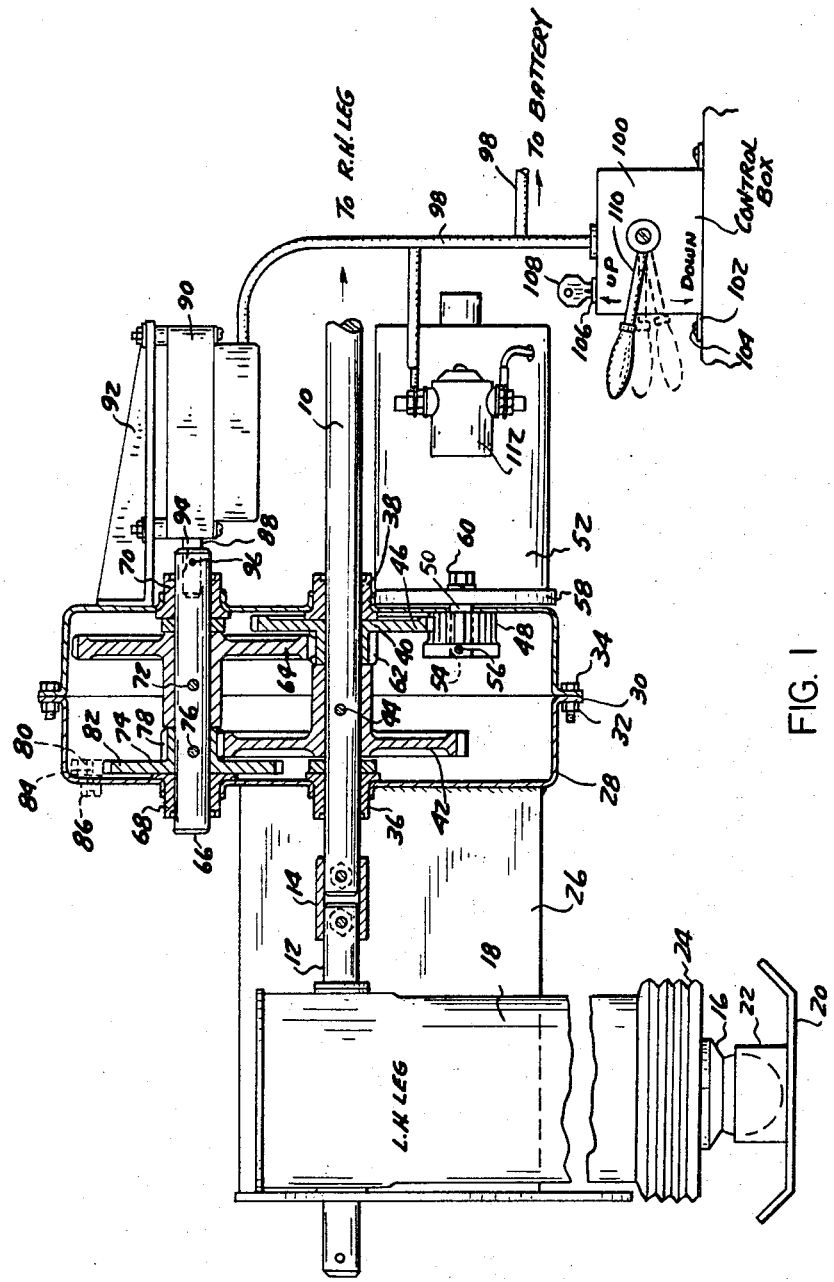

The invention relates to a landing gear of the type used to support the forward end of a semi-trailer when uncoupled from its tractor or other supporting structure. Moe particularly, the invention relates to motor-powered landing gear legs for semi-trailers and the like, and to a mechanism adapted for controllably raising a landing leg structure to a retracted position and for lowering a landing leg structure to a lowered position.

The invention generally contemplates operating a reversible DC motor from a DC power source carried by the semi-trailer, the output shaft of the motor being used to drive a gear reduction mechanism adapted to operate the raising or the lowering of the landing leg structure. The direction of rotation of the electric motor, which determines either the raising or the lowering of the landing leg structure, is controlled by means of a two-position electrical switch adapted to control relay means reversing the direction of electrical current in a winding of the motor so as to cause its output shaft to rotate in one direction or the other. The control switch is preferably normally biased towards the "UP" position, in order to reduce the possibility of the landing leg structure being accidentally lowered while the semi-trailer is hitched to and being pulled by its tractor. Preferably, a lock-operated switch is provided for normally turning off the control mechanism so that it may be operated only by an authorized person having the appropriate key for unlocking the lock. An electrical battery mounted on the semi-trailer and supplying electric power to the motor is normally kept fully charged by being connected to the tractor electrical system, any time the semi-trailer is hitched thereto, through a line and the usual connector provided for electrical interconnection between the tractor and the semi-trailer. Preferably, a unidirectional device is connected in series in the line so that the battery can normally draw current from the tractor electrical system and the tractor electrical system is prevented from drawing current from the battery mounted on the semi-trailer. Additionally, a current limiting means, such as a resistor, is also connected in series in the line to prevent abnormal and damaging drawing of current from the trailer electrical system through lines which are usually made of relatively thin wire and through the connector having limited current carrying capability.

Consequently, the object of the invention is to provide power means for raising or lowering the landing leg structure of a semi-trailer or the like, utilizing as a source of power a battery carried by the semi-trailer and normally maintained at full charge through a unidirectional current limiting interconnection with the tractor electrical system, and with means preventing unauthorized use of the landing gear power mechanism.

Another object of the invention is to provide a powered landing gear for semi-trailers and the like adapted to prevent accidental lowering of the landing leg structure during towing of the semi-trailer by its tractor, and having limit switch means shutting off the electric motor as soon as the landing leg structure is correctly positioned either at its lowered position.

Figure 2:
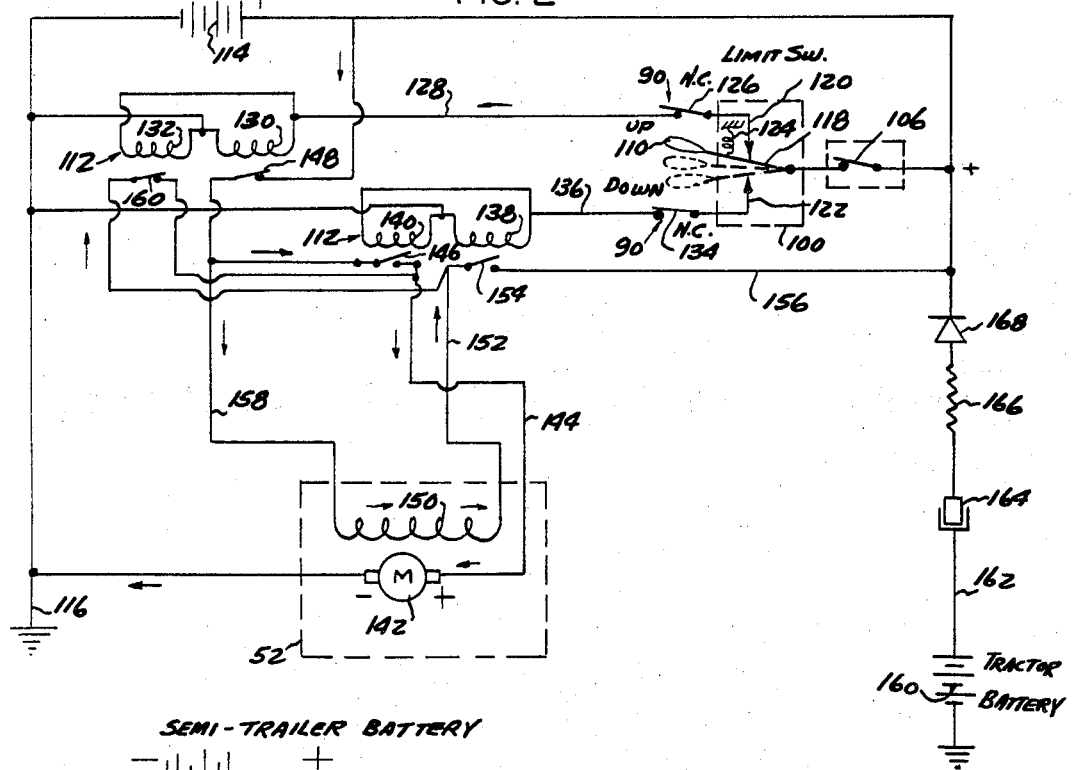
Figure 3:
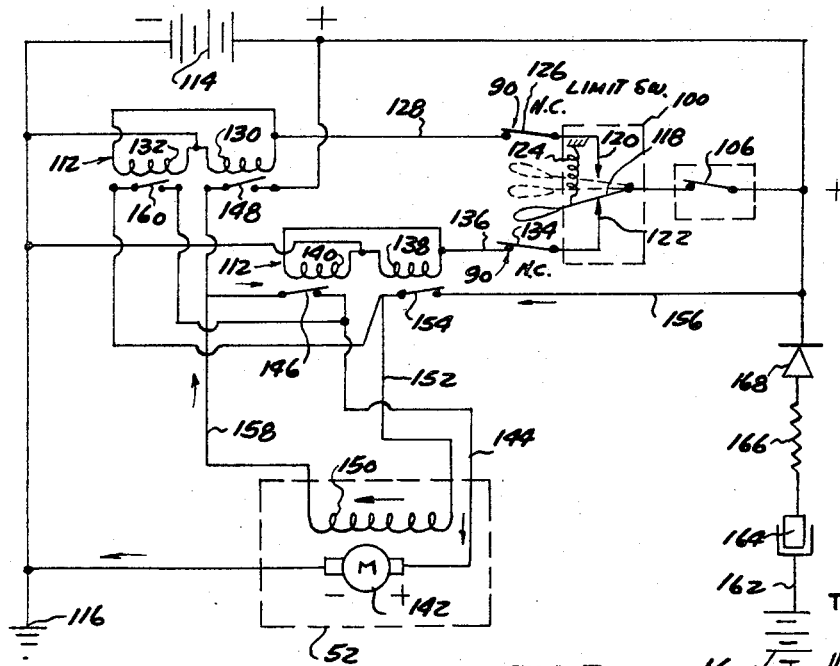

Other objects and advantages of the invention will become apparent when the following description of an example thereof is read in conjunction with the accompanying drawings wherein like reference numerals refer to like parts, and in which:

FIG. 1 is a partly diagrammatic view of an example of a powered landing gear mechanism according to the principles of the invention; and FIGS. 2 and 3 are identical circuit diagrams of the electrical portion of the powered landing gear mechanism of FIG. 1, FIG. 2 showing the electrical connections during raising of the landing leg structure, and FIG. 3 showing the electrical connections during lowering of the landing leg structure.

FIG. 1 represents, partly in a diagrammatic manner, a powered landing gear mechanism for raising or lowering the landing leg structure of a semi-trailer, not shown, such a landing leg structure being operable as a result of rotation of an output shaft 10 in a predetermined direction or in an opposite direction according to whether the structure is desired to be raised or lowered. The landing leg structure may be any conventional swingable or rockable landing leg assembly provided with a ground engaging strut or with ground engaging wheels or rollers. Alternately, the landing leg structure may consist of telescoping legs which may be extended or retracted by means of any appropriate mechanism, such as are disclosed, for example, in U.S. Patents Nos. 3,201,086, 3,201,087, 3,182,-956 and 3,104,891 all in the name of the present applicant, and assigned to the same assignee as the present invention.

In FIG. 1, output shaft 10 is shown coupled to a drive shaft 12 by means of coupling means 14, drive shaft 12 in turn being adapted to operate by way of a mechanism, not shown, the vertical telescoping of leg member 16 relative to leg housing 18, leg member 16 being adapted to carry on its lower end a ground engaging slide or strut 20 by means of a ball and socket assembly 22, a bellows 24 being arranged on the end of leg housing 18 so as to protect from dirt and the like the sliding portion of telescoping leg member 16. The stationary portion of the landing leg structure or leg housing 18 is mounted, by bolting or the like, to a bracket 26 which is part of the semi-trailer frame structure. On bracket 26 is also mounted, by bolting, welding, or the like, a gear housing 28, which in the illustration shown, is made of two half-housings or sections provided with flanges on their abutting ends as shown at 30 so as to permit the two sections to be bolted together by means of fasteners such as nuts and bolts shown at 32 and 34.

Output shaft 10 is journalled, by means of bearings 36 and 38, through two opposite walls of gear box 28 and is adapted to support, in its portion situated within the gear box 28, freely rotating wheel 40 and gear 42 coupled to the shaft by means such as pin 44. Freely rotating wheel 40 has a first large gear 46 adapted to mesh with a pinion 48 fastened on the end of the drive shaft 50 of a reversible electric motor 52 by means such as key 54 and set screw 56. Reversible DC motor 52 has a housing with a flange 58 provided with appropriate apertures, not shown, for the passage of mounting bolts 60 affixing the motor to the side of the gear box housing 28. Integral with freely rotating wheel 40 is a pinion 62 adapted to mesh with a gear 64 arranged to drive a counter shaft 66 journalled with its axis substantially parallel to the axis of output shaft 10 by way of bearings 68 and 70 disposed in two opposite sidewalls of gear box 28. Gear 64 drives countershaft 66 by being keyed thereon by means such as pin 72 and countershaft 66 in turn drives wheel 74 keyed thereon by means such as pin 76. A pinion 78 on wheel 74 meshes with gear 42 keyed to the output shaft 10 such that, when pinion 48 is rotated by electric motor output shaft 50, gear 46 and pinion 62 are caused to rotate. Pinion 62 drives gear 64 which rotates countershaft 66 thus rotating pinion 78 which in turn drives gear 42, thus causing in turn the output shaft 10 to rotate in one direction or the other according to the direction of rotation of the electric motor ouput shaft 50. In this manner, the two ends of output shaft 10 being connected respectively to the right hand and the left hand legs of the landing leg structure of the semi-trailer, the landing leg structure is retracted or raised according to the direction of rotation of output shaft 10. The gear reduction from the electric motor output shaft 50 to the landing leg actuating drive shaft 10 depends from the gear train therebetween and is preferably in a ratio such as about 50 to 1, and means may be provided for manually actuating one of the gears by way of a crank adapted to rotate one of the gears of the gear train, in the event of loss of electrical power or in the event that the electric motor 52 is inoperative. For example, a free rotating pinion shown in phantom line at 80 may be provided so as to mesh with gear 82 being part of wheel 74 keyed to countershaft 66, pinion 80 being keyed to a shaft 84, journalled through one side wall of the gear box 28 and being provided on the outside with a driving head 86 in which may be engaged the driving end of a crank or the like. It is evident that, depending upon the gear ratio chosen for manually actuating the raising or lowering of the landing leg structure, other manual driving means may be provided at any other convenient locations within the gear train.

One end of countershaft 66 is adapted to drive the input shaft 88 of a rotary limit switch assembly 90 mounted on a bracket 92 which is in turn mounted, for example by welding or bolting, upon an appropriate side of gear box 28. In the example illustrated in FIG. 1, the approprate end of countershaft 66 has an axial bore 94 adapted to accept the end of rotary limit switch drive shaft 88, the two shafts being coupled together by means such as pin 96. The limit switch 90 may be any conventional rotary limit switch such as for example, rotary switch model 2000–29 made by Gemco Electric Co., of Clawson, Mich.

Electrical power is supplied to the mechanism of the invention from an electrical storage battery, not shown in FIG. 1, which is mounted at any convenient location on the semi-trailer, electrical power being supplied therefrom to the diverse elements and electrical connections being effected by way of an electrical harness such as shown at 98.

A control box 100 is mounted in any convenient position on the semi-trailer by way such as mounting flange 102 and fasteners 104, control box 100 being normally disabled by way of a lock such as shown at 106 which can be unlocked only by an approprate key 108 so that the landing gear mechanism can not be operated by any unauthorized person. The control box 100 has a movable control handle 110 which can be placed to either UP or DOWN position. When placed in the UP position, control handle 110 causes the semi-trailer leg structure to be raised, and when placed in the DOWN position, the control handle 110 causes the leg structure to be lowered. Preferably, control handle 110 is normally urged by means such as a spring bias to the UP position, so that there results a lessened possibility of lowering the landing leg structure while the semi-trailer is being operated on the highway, such urging to the UP position being of no consequence otherwise in view of the safety interlock system provided by rotary limit switch means 90, as will be hereinafter explained in further detail.

The position of the control handle 110 in either the UP or DOWN position controls relay means 112 connected thereto which in turn controls the direction of rotation of the output shaft 50 of electrical motor 52 as will be hereinafter also explained in further detail.

FIGS. 2 and 3 represent an electrical schematic of the power landing gear arrangement of FIG. 1, FIGS. 2 and 2 being identical at every point of view except with respect to the position of the manually actuated switches and relay actuated switches controlling the direction of flow of electrical current through a winding of electric motor 52 so as to cause its output shaft to rotate in one direction or the other. With reference first to FIG. 2, the semi-trailer on which is mounted the power actuated landing leg structure is provided with its own DC power supply consisting for example of an electrical storage battery 114 of the normal rechargeable type, having, for example, its negative terminal grounded as shown at 116 and its positive terminal connected through lockable switch 106 to a movable contact 118 adapted to be engaged, by way of control handle 110 of control box 100, with first stationary contact 120 for UP motion of the landing leg structure and to a second stationary contact 122 for DOWN motion of the landing leg structure. Control handle 110 is preferably urged by any conventional biasing means, such as spring 124, to the UP position engaging movable contact 118 with stationary contact 120 when the handle is released. Limit switching means 90 comprises a first limit switch 126, normally closed, connected by way of a line 128 to a first coil 130 of relay 112 and to a parallelly disposed coil 132 of the relay, the other end of the coils being grounded. Second stationary contact 122 is connected through normally closed switch 134 of limit switching means 90 by way of a line 136 to parallel coils 138 and 140 of second half of relay 112, the other ends of the coils being also grounded as shown.

Electrical motor 52 has, for example, an armature 142 connected between ground 116 and the positive terminal of battery 114 by way of a line 144 having series disposed relay actuated switch 146, actuated by coil 140, and switch 148, actuated by coil 130. Electrical motor 52 has also a field winding 150 having one end connected by a line 152 to a switch 154, actuatable by relay coil 138, and from switch 154 through a line 156 to the positive terminal of battery 114, the other end of field winding 150 being also connected to the positive terminal of battery 114 through a line 158 and switch 148 actuatable by relay coil 130. A switch 160 actuatable by relay coil 132, is connected between line 152 and line 144.

With switch 106 closed, when handle 110 is displaced to the UP position shown in FIG. 2, movable contact 118 engages stationary contact 120 and current is caused to flow through normally closed limit switch 126 through relay coils 130 and 132 arranged to cause switches 148 and 160 respectively to close. Switches 146 and 154 being open, current is caused to flow in the direction of the arrows from the positive terminal of battery 114 through switch 148, through line 158, across field winding 150, through line 154, through closed switch 160, through line 144, across the armature 142 of the electrical motor 52 to ground. This causes the output shaft of motor 52 to rotate in a direction that raises the landing leg structure to its retracted position.

Just previously to the landing leg structure reaching its retracted position, the rotation of countershaft 66, FIG. 1, causes, through input shaft 88 of the rotary limit switching means 90, limit switch 126 therein to open. This in turn causes relay coils 130 and 132 to be deactivated, thus opening respectively switches 148 and 160. The flow of current through the field and armature windings 150 and 142 of motor 52 is interrupted and the motor stops, thus preventing any overriding and stress being imposed upon the landing gear mechanism as soon as the landing leg structure reaches its fully retracted position.

If, as shown in FIG. 3, manually operated control handle 110 is depressed to the DOWN position against the retracting action of spring 124, movable contact 118 is caused to engage stationary contact 122, thus placing relay coils 138 and 140 across the battery 114 through normally closed limit switch 134. Relay coils 140 and 138 are arranged to operate switches 146 and 154, respectively, from an open to a closed position so that current is caused to flow in the direction of the arrows from the positive terminal of battery 114, through line 156, through closed switch 154, through line 152, across the field winding 150 of electric motor 52, through line 158 to closed switch 146, through line 144 and across the armature 142 of the motor to ground return 116. It is to be noted that although the current flow direction through the armature 142 of electrical motor 52 is the same in FIG. 3 as in FIG. 2, the direction of current flow through the field winding 150 is reversed in FIG. 3 as compared to the direction of FIG. 2, such that the direction of rotation of the output shaft of motor 52 according to the connections of FIG. 3 is opposite to the direction of rotation according to the connections of FIG. 2. Consequently, the landing leg structure is lowered as a result of the electrical connections being established as represented in FIG. 3, until it occupies a position close to its lowermost position, at which time the rotation of countershaft 96 of FIG. 1 cause input shaft 88 of rotary limit switch means 90 to open normally closed limit switch 134, thus deactivating relay coils 138 and 140 with the result that relay coil operated switches 154 and 146 are open, thus opening the armature and the field winding circuits of the electric motor 52. The output shaft of motor 52 is thus caused to cease to rotate.

Semi-trailer mounted battery 114 is normally kept in a charged condition while the semi-trailer is hitched to its tractor as a result of the battery 114 being placed across the electrical system of the tractor represented in the drawings of FIGS. 2 and 3, by tractor battery 160, the positive terminal of which is connected to the positive terminal of the semi-trailer battery 144 through a line 162, a connector 164, current limiting resistor 166 and a current unidirectional means represented by diode 168. In this manner, current is caused to flow from the tractor electrical system to the semi-trailer battery 114, but opposite current flow is prevented by unidirectional means 168. The amount of current flowing into semi-trailer battery 114 is limited in view of the presence in series between the tractor electrical system and the semi-trailer battery of current limiting means 166, such that the amount of current drawn by the electrical system of the semi-trailer is limited to a value that can safely be handled by the size of line 162, which is somewhat limited in diameter and thus in current carrying capacity, and by the contacts of connector 164. In this manner, semi-trailer battery 114 is maintained properly charged all the time that the semi-trailer is hitched to a tractor with a normally functioning electrical system, no damage due to current overload is caused to the electrical connections between the tractor and the semi-trailer, and there is no possibility for the electrical system of the tractor drawing current from the semi-trailer battery.

Having thus described the invention by a typical example thereof, applications or modifications whereof will become apparent to those skilled in the art, what is claimed as new is:

1. In a powered landing gear for semi-trailers and the like having a landing leg structure adapted to be operable between a retracted position and a lowered position, the combination comprising:
   a source of DC electrical power on said semi-trailer;
   a DC reversible electrical motor having a field winding, an armature winding and an output shaft;
   a first pinion keyed on said output shaft;
   a first gear driven by said pinion;
   a countershaft having a driving gear driven by said first gear and keyed on said countershaft;
   a second pinion keyed on said countershaft;
   a third gear driven by said second pinion;
   an output shaft adapted to operate the landing leg structure, said output shaft being driven by said third gear;
   a control switch adapted to occupy an UP position and a DOWN position, said control switch being provided with spring biasing means normally urging said control switch to the UP position;
   a key operated lock adapted to operate an on and off switch electrically connected between said source of DC electrical power and said control switch;
   first relay means actuated when said control switch occupies the UP position and adapted to connect the field winding of said electrical motor across said source of DC power according to a polarity causing said motor output shaft to rotate in a direction that raises said landing leg structure to its retracted position;
   second relay means actuated when said control switch occupies the DOWN position and adapted to connect the field winding of said electrical motor across said source of DC power according to an opposite polarity causing said motor output shaft to rotate in a direction that lowers said landing leg structure to its lowered position;
   and normally closed limit switch means operable when said landing gear reaches an extreme position for deactivating said relay means.

2. The combination of claim 1 wherein said source of DC electrical power is a rechargeable storage battery connected to the electrical system of a tractor adapted to be hitched to said semi-trailer for normally pulling said semi-trailer; and wherein electrical current unidirectional means preventing said electrical system from drawing current from said battery whilst permitting said battery to be normally charged from said electrical system is interposed between said storage battery and said tractor electrical system.

3. The combination of claim 2 further comprising current limiting means preventing said battery from drawing from said electrical system more than a predetermined amount of current.

4. The combination of claim 1 wherein said limit switch means is operated from said countershaft.

5. In a powered landing gear for semi-trailers and the like having a landing leg structure adapted to be operable between a retracted position and a lowered position, the combination comprising:
   a source of DC electrical power on said semi-trailer, said source being a rechargeable storage battery;
   a DC reversible electrical motor having a field winding, an armature winding and an output shaft;
   an output shaft adapted to operate the landing leg structure;
   gear reduction means between said motor output shaft and said landing leg structure output shaft;
   a control switch adapted to occupy an UP position and a DOWN position and having biasing means normally urging said control switch to the UP position;
   a key operated safety switch between said source of DC power and said control switch;
   first relay means actuated when said control switch occupies the DOWN position and adapted to connect field winding of said electrical motor across said source of DC power such as to cause said motor output shaft to rotate in a direction that raises said landing leg structure to its retracted position;
   second relay means actuated when said control switch occupies the DOWN position and adaptted to connect the field winding of said electrical motor across said source of DC power such as to cause said motor output shaft to rotate in a direction that lowers said landing leg structure to its lowered position;

normally closed limit switch means operable when said landing gear reaches its extreme positions for deactivating said relay means;

electrical connector means between said storage battery and the electrical system of a tractor capable of being hitched to said semi-trailer;

electrical current unidirectional means in said electrical connector means for preventing said electrical system from drawing current from said battery whilst permitting said battery to be normally charged from said electrical system;

and current limiting means preventing said battery from drawing from said electrical system more than a predetermined amount of current.

6. The combination of claim 5 wherein said limit switch means is operated by said gear reduction means.

References Cited

UNITED STATES PATENTS

| | | | |
|---|---|---|---|
| 1,907,208 | 5/1933 | Lebel | 254—86 X |
| 2,001,411 | 5/1935 | Davis | 254—86 X |
| 2,131,296 | 9/1938 | Petsche et al. | 254—102 |
| 2,161,630 | 6/1939 | McDonnell | 235—132 |
| 3,090,871 | 5/1963 | Gorman | 320—2 X |
| 3,129,372 | 4/1964 | Warren | 320—15 |

FOREIGN PATENTS

| | | |
|---|---|---|
| 1,095,463 | 12/1954 | France. |

OTHELL M. SIMPSON, *Primary Examiner.*